United States Patent
Sadoudi et al.

(10) Patent No.: US 11,604,902 B2
(45) Date of Patent: Mar. 14, 2023

(54) MODELING USING A WEAK TYPE DEFINITION

(71) Applicant: DASSAULT SYSTEMES, Velizy-Villacoublay (FR)

(72) Inventors: Yani Sadoudi, Velizy-Villacoublay (FR); Frederic Letzelter, Velizy-Villacoublay (FR)

(73) Assignee: DASSAULT SYSTEMES, Velizy-Villacoublay (FR)

( * ) Notice: Subject to any disclaimer, the term of this patent is extended or adjusted under 35 U.S.C. 154(b) by 572 days.

(21) Appl. No.: 16/730,876

(22) Filed: Dec. 30, 2019

(65) Prior Publication Data

US 2020/0210632 A1 Jul. 2, 2020

(30) Foreign Application Priority Data

Dec. 30, 2018 (EP) ..................................... 18306891

(51) Int. Cl.
*G06F 30/12* (2020.01)
*G06F 30/17* (2020.01)
(Continued)

(52) U.S. Cl.
CPC .............. *G06F 30/12* (2020.01); *G06F 30/17* (2020.01); *G06F 2111/02* (2020.01); *G06F 2119/18* (2020.01)

(58) Field of Classification Search
CPC .......... G06F 30/12; G06F 30/17; G06F 30/00; G06F 2111/02; G06F 2119/18; G06F 2111/04; G06T 17/00
(Continued)

(56) References Cited

U.S. PATENT DOCUMENTS 9,117,308 B1 8/2015 Nag et al.
2008/0174599 A1 * 7/2008 Rothstein ................ G06T 17/10
345/420
(Continued)

FOREIGN PATENT DOCUMENTS

EP          1 501 026 A1      1/2005
WO     WO-2017186786 A1 * 11/2017   ......... G06F 17/5009

OTHER PUBLICATIONS

Briere-Cote, Antoine et al., "Comparing 3D CAD Models: Uses, Methods, Tools and Perspective"201, Computer-Aided Design & Applications, 9(6), CAD Solutions, LLC. (Year: 2012).*
(Continued)

*Primary Examiner* — Cedric Johnson
(74) *Attorney, Agent, or Firm* — Oblon, McClelland, Maier & Neustadt, L.L.P.

(57) ABSTRACT

The disclosure notably relates to a computer-implemented method for designing a three-dimensional (3D) model. The method includes obtaining a first 3D model, the first 3D model being defined by: (i) one delegated data object comprising input parameters specific to a type of the delegated data object and (ii) an output topology, and being associated with a sequence of geometric design operations. The method also includes performing, by a user, a first geometric design operation on the first 3D model, thereby obtaining a second 3D model, determining whether the output topology of the second 3D model can be retrieved from the output topology of the first 3D model, replacing the first delegated data object by a second delegated data object if the output topology of the second 3D model cannot be retrieved from the output topology of the first 3D model or keeping the first delegated data object and storing the first geometric design operation with the sequence of geometric design operations associated the first 3D model.

17 Claims, 9 Drawing Sheets

(51) Int. Cl.
*G06F 119/18* (2020.01)
*G06F 111/02* (2020.01)

(58) Field of Classification Search
USPC .............................................................. 703/1
See application file for complete search history.

(56) References Cited

U.S. PATENT DOCUMENTS

2011/0025688 A1  2/2011  Schneider et al.
2012/0084060 A1  4/2012  Gunasena et al.

OTHER PUBLICATIONS

Extended European Search Report dated Jun. 28, 2019 in European Patent Application No. 18306891.5.
Extended European Search Report dated Jul. 5, 2019 in European Patent Application No. 18306890.7.
Thomas Convard et al., History Based Reactive Objects for Immersive CAD, ACM Symposium on Solid Modeling and Applications (2004), pp. 291-296.

\* cited by examiner

MODELING USING A WEAK TYPE DEFINITION

CROSS-REFERENCE TO RELATED APPLICATIONS

This application claims priority under 35 U.S.C. § 119 or 365 to European Application No. 18306891.5, filed Dec. 30, 2018. The entire contents of the above application(s) are incorporated herein by reference.

FIELD OF THE INVENTION

The disclosure relates to the field of computer programs and systems, and more specifically to a data structure, method, system and program for designing a 3D model.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

CAD software propose ways to create three-dimensional (3D) models called parts using a set of tools that can be divided in two categories: History-based approach (also referred to as Parametric Modeling) and History-free approach (also referred to as Direct Modeling)

History-based approach was designed to capture design intent by to storing each step of the creation process using features, constraints, etc. . . . It is really like a part recipe; each step of the creation exposes a set of parameters the user can change. If he does change one parameter, the whole 'recipe' is replayed in the same exact order to regenerate the new part. This approach is generally represented with a tree which allows the user to quickly understand the order of the operations.

History-free approach does not rely on a sequence of operation being replayed at each modification. Each modification is done on the current 3D model. That is to say that there are no intermediary steps, no "recipe", when the user modifies his design, the modification is absorbed by the feature and as such, the parameters leading to the modification are not kept. This approach allows the user to create 3D model more quickly and more freely because the order in which the operations are done is not kept. The user can focus on the geometry he is creating instead of worrying about the order in which he should create his features. Moreover, he does not have to worry about the impact of his modification.

The advantage of the history-based approach is also its drawback. The parametric approach, although it is very convenient to be able to change parameters almost anytime, brings rigidity to the design process. Once the 'recipe' is created, each feature being strongly typed, you can only play with the parameters. Any other change can be very complicated because, to get the change the user wants, he has to think about how it will affect the result when the part is regenerated. In a context where the user wants to test different type of shapes and wants to iterate quickly, this is a major drawback.

The objects used in the history-based approach are strongly typed. In order to change the type of an object, one needs to create a whole new one object and replace the original one by the new one in the tree representing operation orders. The new object having no link whatsoever with the replaced one, may not fit well in the current "recipe" due to topology changes. It happens if an operation cannot find anymore the elements it needed to compute its modification because the object it relies on changed. In this case, the user will have to explicitly tell the system how to do it. It is a tedious task and the more complex the history is, the more tedious and time consuming.

With the history-free approach, the user is able to quickly iterate on the shape because the feature he is working on is not typed at all, he is working on a generic feature that does not store any information of the creation process. So even though the user can iterate quickly on his shape, he can only modify the current state of his 3D shape. He does not have access to any parameters of any of his previous operations.

The history-based and the history-free approaches are not incompatible, as an object generated from a history-free context can be integrated in an history-based context. To be more precise, a user could create an history-free model and apply operations on it which will generate a new 3D model from it.

However, the respective data structures of these two approaches are not interoperable. Indeed, data structures for objects generated by the history-based and history free-approach are a bit different; notably because the data structures of object in the history-based approach is strongly typed, while the data structure in the history-free approach is weakly typed. The type of a 3D model in a history-based context refers to its characteristics, it is defined by a set of parameters and at least one operation taking as inputs the set of parameters and returning as an output the object's topology. For instance, and in reference to FIG. 1, a 3D Sphere is a typed 3D model, the "sphere" type comes with its set of parameters that are its center, radius and opening angle. This comes with an operation that takes all these parameters as input and is able to return the topology of the sphere. On the contrary, in a history free context, the shapes created have no type by definition as the object does not have any parameters. Each operation applied on the object is applied on the current definition of this object. In the example of FIG. 3, the user would only access the topology of the sphere, that is, the wireframe that is comprised of all the vertices, edges and from that information the faces can be made.

To summarize, the data structure of the history-based approach comprises input parameters specific to the type, at least one operation specific to the type, and output topology generated by the previous operation(s). The data structure of the history-free approach comprises the current topology generated by the last external operation applied on the object.

Because of these fundamental differences between the two approaches, current history-free approaches do not allow to retrieve the "recipe" of the modifications performed by the user on the 3D model (which amounts to say on the mesh). Especially, it is not possible to automatically retrieve and apply the same or similar design operations performed on a first 3D model on a new mesh. For instance, a designer that has modified the design of the door of a first model of car cannot automatically apply the same modifications on the door of a second car model. This means that it is almost impossible to reuse a design a design intent in a history-free CAD approach; the designer has to intuitively apply modifications on the mesh of the second model of car with the hope to reproduce his/her initial design intent.

Within this context, there is still a need for a method for designing a three-dimensional model.

SUMMARY OF THE INVENTION

It is therefore provided a computer-implemented method for designing a three-dimensional (3D) model. The method comprises:
  providing a first 3D model, the first 3D model being defined by:
    (i) one delegated data object comprising input parameters specific to a type of the delegated data object; and
    (ii) an output topology;
  and being associated with a sequence of geometric design operations;
    performing, by a user, a first geometric design operation on the first 3D model, thereby obtaining a second 3D model;
    determining whether the output topology of the second 3D model can be retrieved from the output topology of the first 3D model;
    replacing the first delegated data object by a second delegated data object if the output topology of the second 3D model cannot be retrieved from the output topology of the first 3D model or keeping the first delegated data object and storing the first geometric design operation with the sequence of geometric design operations associated the first 3D model.

The method may comprise one or more of the following:
  determining whether the output topology of the second 3D model can be retrieved from the output topology of the first 3D model is performed by determining topological stability between the output topology of the first 3D model and the output topology of the second 3D model;
  each of the output topology of the first and second 3D models forms a base mesh and wherein the determining topological stability is performed by comparing the base mesh of the first 3D model with the base mesh of the second 3D model;
  replacing the first delegated data object by a second delegated data object comprises: comparing the second output topology with a list of output topologies, each output topology of the list being associated with one respective delegated data object; automatically selecting a third delegated data object as a result of the comparison, the third delegated data object being a delegated data object of the list with an associated output topology that is similar to the second output topology.
  replacing the first delegated data object by the second delegated data object further comprises emptying the sequence of geometric operations;
  storing the first geometric design operation comprises: identifying at least one vertex of a geometry associated with the first delegated data object having its position modified by the design operation; computing a transformation of the identified at least one vertex, the transformation resulting of the first design operation;
  providing the first 3D model comprises creating the first 3D model, the creation being a first geometric design operation, and the sequence of geometric design operations of the created first 3D model is empty;
  the first geometric design operation is a modification of at least one input parameter value of the first 3D model;
  the storing the design operation with the sequence of geometric design operations is performed according to a successive arrival order, the latest arrived design operation being stored at the end of the sequence of geometric design operation.

It is further provided a computer program comprising instructions for performing the method.

It is further provided a computer readable storage medium having recorded thereon the computer program.

It is further provided a system comprising a processor coupled to a memory, the memory having recorded thereon the computer program. The system may comprise a graphical user interface.

It is also provided a data structure defining a three-dimensional (3D) model. The data structure comprises one delegated data object. The said one delegated data object comprises input parameters specific to a type of the delegated data object, and at least one operator specific to the type of the delegated data object for generating an output topology. The data structure also comprises an output topology generated by the operator.

The data structure may further comprise an interface to add or remove at least one operator.

BRIEF DESCRIPTION OF THE DRAWINGS

Embodiments of the disclosure will now be described, by way of non-limiting example, and in reference to the accompanying drawings, where.

DETAILED DESCRIPTION OF THE INVENTION

Figure 8:
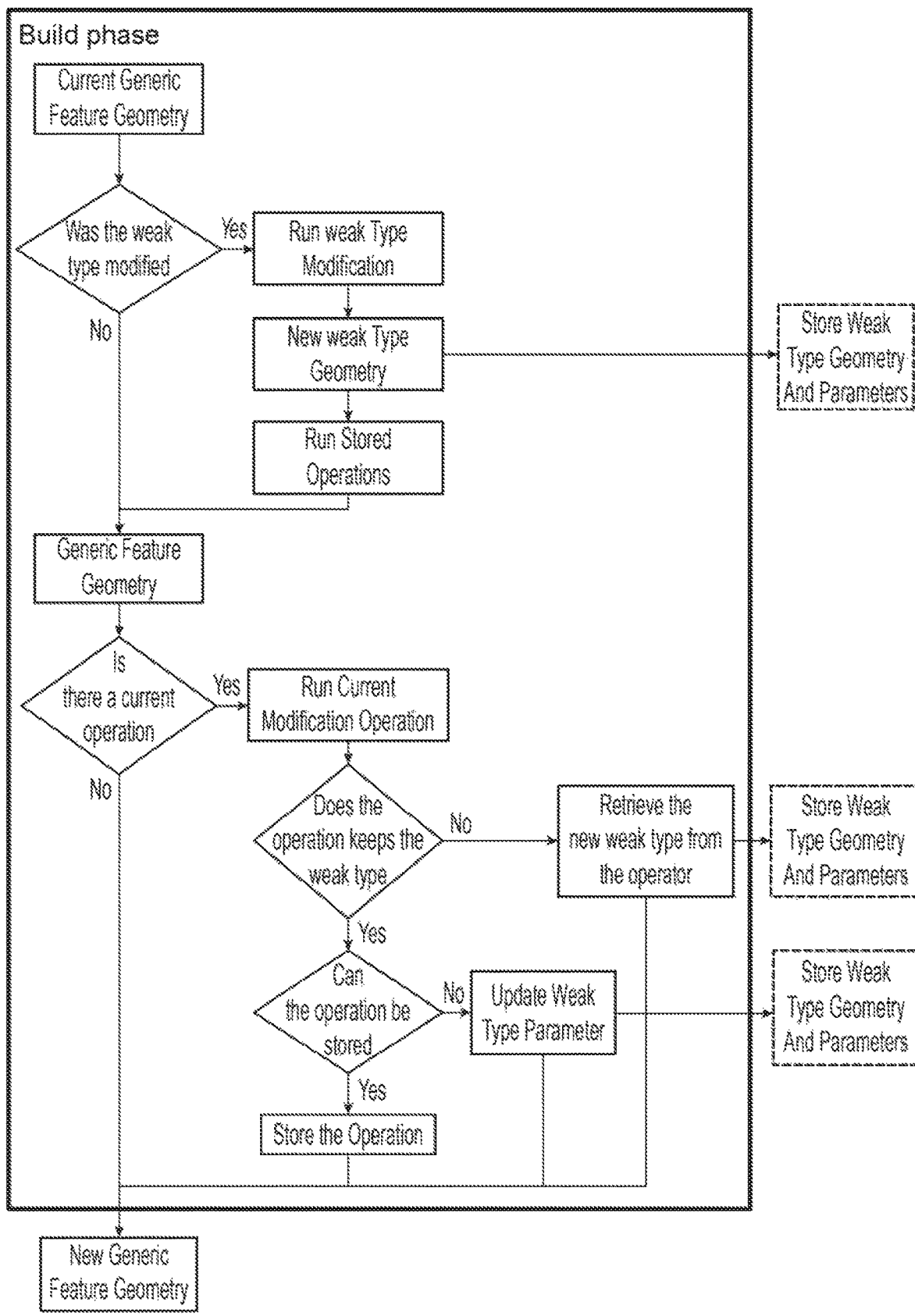
FIG. 8 illustrates an example of a method for designing a 3D model defined by a data structure.

With reference to FIG. 8, it is proposed a computer-implemented method for designing a three-dimensional (3D) model. The method comprises providing a first 3D model. The first 3D model is defined by (I) one delegated data object comprising input parameters specific to a type of the delegated data object, and (ii) an output topology. The first 3D model is also associated with a sequence of geometric design operations. The method further comprises performing, by a user, a first geometric design operation on the first 3D model, thereby obtaining a second 3D model. The method also comprises determining whether the output topology of the second 3D model can be retrieved from the output topology of the first 3D model. In addition, the method comprises replacing the first delegated data object by a second delegated data object if the output topology of the second 3D model cannot be retrieved from the output topology of the first 3D model or keeping the first delegated data object and storing the first geometric design operation with the sequence of geometric design operations associated the first 3D model.

Such a method improves the design of a 3D model in a history-free computer-aided design system.

Notably, the 3D model is defined by a particular data structure, where the 3D model comprises one delegated data object comprising one or more input parameters specific to a type of the delegated data object and an output topology. The 3D model, and its data structure, allows to lift the limitations of a history-free approach by introducing the notion of "weak type" and "flexible modeling". Like the history-free approach, the data structure defining the 3D model is generic. Instead of taking an object defining its type as an input, a generic object delegates its type to another object. This other type of object is also called "weak type". Thanks to this delegated data object, it is possible to design the 3D model by use of the data structure that is a generic feature: the generic feature has a type, like in the history-based approach. However, this type is not strongly linked with the feature as the type is delegated to the delegated data object. This allows the feature to change type along its lifecycle, depending on the context and the operations. Hence, the data structure is sufficiently generic so that it is possible to keep it during design operations, and to change it if necessary or asked by the designer. In addition, the data structure offers new possibilities for the designer regarding the creation of features: indeed, the delegated data object is not necessarily linked to a common feature (e.g. plane, cylinder, sphere, torus . . . ) and any shape (e.g. designer by the user) may be used for obtaining a new delegated data object's type.

Such a method improves the design of a 3D model in a history-free computer-aided design system. Notably, the method relies on a data structure that allows lifting of the limitations of history-free approach by introducing the notion of "weak type" and "flexible modeling". The present method allows to keep or to replace a delegate data object depending a change of topology occurs or not while designing the first 3D model. Despite the history-free approach, successive operations done on a 3D model can be stored, each operation works on the last state of the feature. If design operations are not too destructive, the delegated object can be kept, because in reality, the operation is modifying one of delegated object parameters. In addition, the present method ensures that the object visible in a feature tree never changes, only the underlying delegated data object changes. Consequently, when the delegated data object changes, the system still knows the previous and the new type of the 3D model. Despite the replacement of the delegated data object by a new one, the knowledge of the object being replaced can be kept. Flexibility of the history-free approach is thus improved. The 3D model (and its delegated data object) can be affected by any operation done on the feature it belongs to. If the operation is in fact only modifying one of the weak type parameters, the weak type is kept which means that the user can still modify the other parameters. If, on the contrary, the operation modifies something that cannot be described by a modification in the weak type's parameters, the current weak type is lost, replaced by a more appropriate one. In order to be used at its fullest, the current weak type of a feature should be kept as long as possible. The longer the current weak type is kept, the more the user is able to modify its parameters, thus giving him more control over his shape. The limitation here is that most operations do not allow keeping of the original weak type. The method allows overcoming this limitation by storing the modifications that are topologically stable. The order in which such operations are done is kept with the current delegated data object, which means that every time the delegated data object is modified, the system can replay the whole sequence and apply the modifications stored. Therefore, the system can keep the current weak type much longer, expanding its life cycle.

Because the system is able to keep the weak type longer, the user has more control over his shape. Moreover, because the method is adapted for a history-free context, the user does not have to worry about the order in which he does his modification, the system is handling it for him.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

For instance, the step of modifying the first delegated data object is performed upon user action, e.g. during design operation.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The data structure defines a 3D model and the method the method to generally manipulates the data structure, and thus a 3D model. A 3D model is also referred to as modeled object. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational 6-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a to 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

By CAE solution, it is additionally meant any solution, software of hardware, adapted for the analysis of the physical behavior of a modeled object. A well-known and widely used CAE technique is the Finite Element Method (FEM) which typically involves a division of a modeled objet into elements which physical behaviors can be computed and simulated through equations. Such CAE solutions are provided by Dassault Systèmes under the trademark SIMULIA®. Another growing CAE technique involves the modeling and analysis of complex systems composed a plurality components from different fields of physics without CAD geometry data. CAE solutions allow the simulation and thus the optimization, the improvement and the validation of products to manufacture. Such CAE solutions are provided by Dassault to Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

Figure 13:
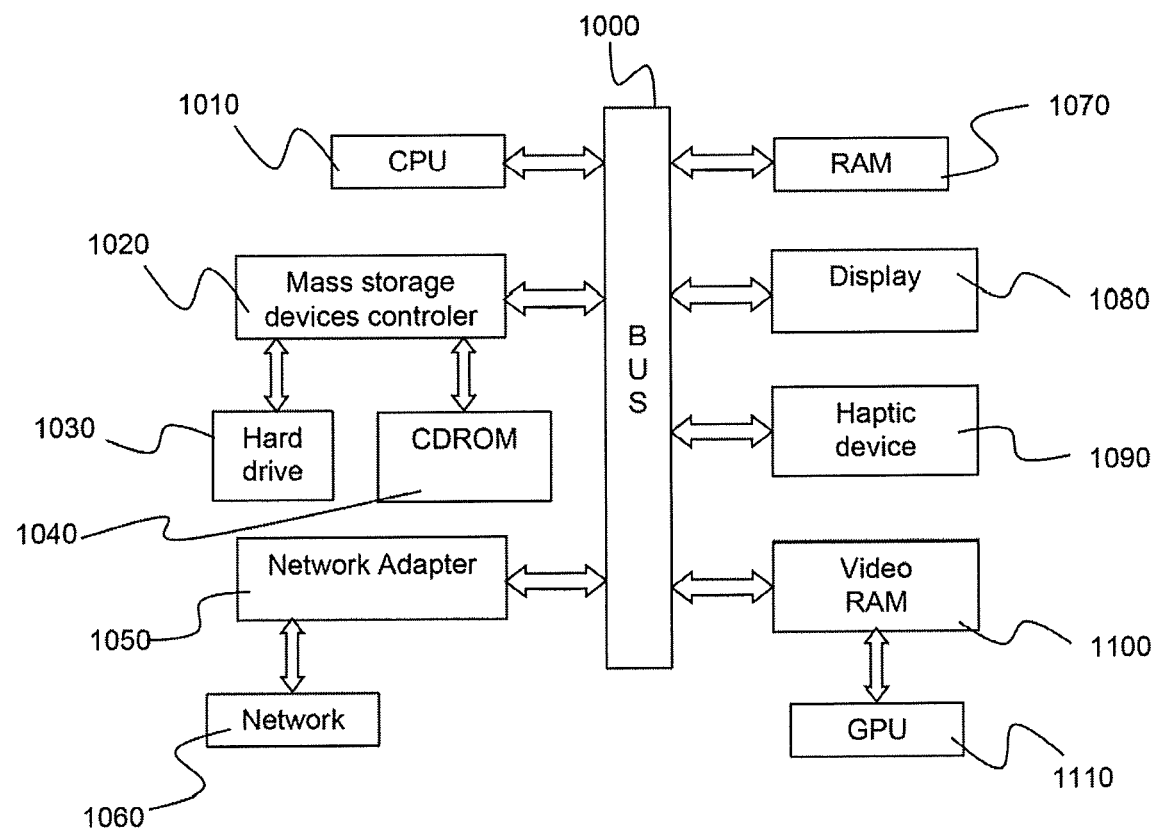
FIG. 13 shows an example of the system.

FIG. 13 shows an example of the system, wherein the system is a client computer system, e.g. a workstation of a user.

The client computer of the example comprises a central processing unit (CPU) 1010 connected to an internal communication BUS 1000, a random-access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The data structure is a functional data that serves to control operations of the CAD system (or the like). And therefore, the data structure serves to control operations for designing a 3D model, e.g. on a history-free CAD system. Especially, the data structure improves design operations as creating shapes have type and parameters that are passed to a generic feature which is not strongly typed, but on the contrary weakly typed. Here, the data structure is functional data for the technical feature of designing a 3D model, e.g. representing an object of the real world.

"Designing a 3D modeled object" designates any action or series of actions, which are at least part of a process of elaborating a 3D modeled object. Thus, the method may comprise creating the 3D modeled object from scratch. Alternatively, the method may comprise providing a 3D modeled object previously created, and then modifying the 3D modeled object. The method may be included in a manufacturing process, which may comprise, after performing the method, producing a physical product corresponding to the modeled object. In any case, the modeled object designed by the method may represent a manufacturing object. The modeled object may thus be a modeled solid (i.e. a modeled object that represents a solid). The manufacturing object may be a product, such as a part, or an assembly of parts. Because the method improves the design of the modeled object, the method also improves the manufacturing of a product and thus increases productivity of the manufacturing process.

Figure 1:
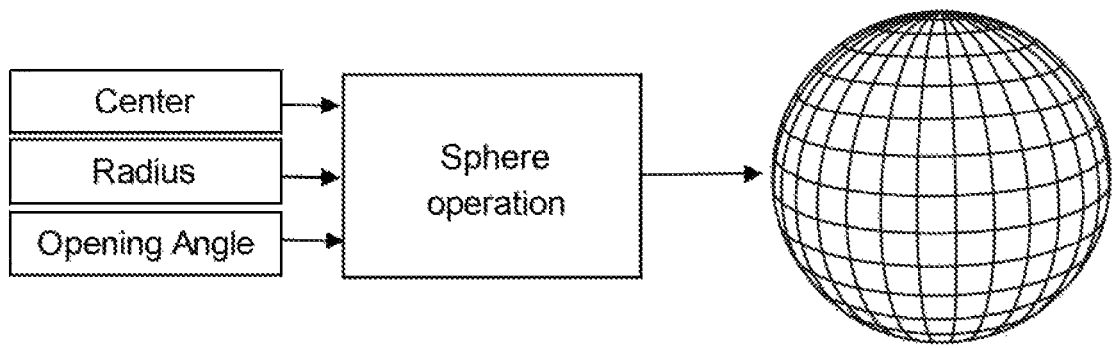
FIG. 1 shows an example of a strongly type object.

FIG. illustrates an example of a strongly typed data structure generally used by known history-based CAD systems. In this example, the data structure defines a feature 3D Sphere, where the 3D Sphere is a typed 3D model. The feature 3D sphere defines a type 3D sphere, where the type comes with a set of parameters that are the center, the radius and the opening angle of the sphere. The data structure comes with one single operation which is a sphere operation. The output of the typed feature returns the topology of a sphere, as represented on right of FIG. 1.

Now, from a history-free approach point of view, only the mesh representing the sphere is available to the system. The history-free paradigm is that the feature is generic: this means that the CAD system is not aware that the mesh (the wireframe that comprises all the vertices, the edges and from that information faces of the wireframe can be made) represents a sphere as the CAD system only accesses the mesh. So, even though the designer can quickly iterate on the shape, he can only modify the current state of the mesh; thus modifying only a parameter of the sphere is not possible, e.g. the designer cannot modify the radius of the mesh having a 3D shape of 3D sphere.

Figure 2:
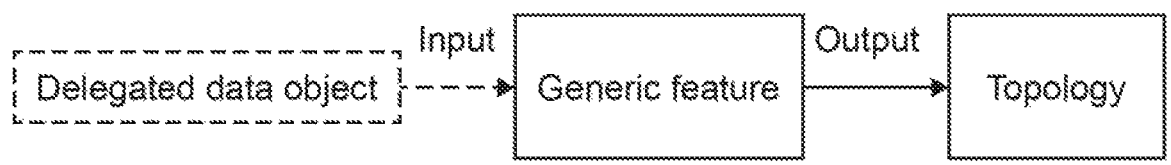
FIGS. 2, 3, and 4 show examples of a data structure.

FIG. 2 illustrates an example of the data structure of the embodiments. The data structure (or feature) is generic, which means that the data structure is not typed, and thus not linked to one specific type of object, e.g. a sphere primitive. A feature is a building block from which a shape can be obtained. Features are commonly used in 3D modeling for building a 3D modeled object. As non-limiting examples, a "classic" feature can be of the type parallelepiped (e.g. a cuboid), cylinder, sphere, pyramid, cone, quadric, is ruled surface, tori . . . . More generally, a feature can represent any shape, and even very complex shapes such as a car or a plane, while the feature owns a set of parameters that are sufficient for a specific operator to generate the shape. A set of features may allow describing an industrial product, e.g. the industrial product represented by a mesh in a history-free CAD system.

The data structure being generic, it can be used in a history-free CAD system. A generic feature is independent of a type of feature. However, the generic feature can receive data, execute data and obtain a result that is similar to the one provided by a feature having a type. The data structure takes as input a delegated data object that defines a type of the feature. The delegated data object contributes to "weakly type" the generic feature. This means that the data structure is generic, with a genericity that is restrained by the delegated data object. As the data structure is generic, the data structure not linked to one particular operation. The operation comes together with the delegated data object. Hence, the (generic) data structure inherits a type and an operator that is specific to the type the delegated data object.

The inheritance is performed by providing as an input the delegated data object (which comprises the type and the specific operator) to the generic feature. The output is a topology that is computed by the generic feature from the input. The topology is thus specific to the type provided in input.

Figure 3:
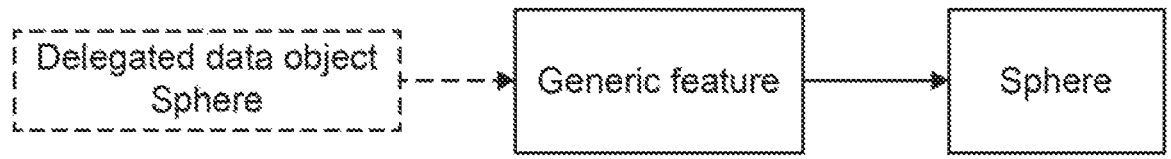

This is illustrated on FIG. 3 where the (generic) data structure takes in input a delegated data object of the type sphere and the topology produced by the data structure is a sphere. The production of the sphere is controlled by the operator of the type, the operator being executed (or run) by the data structure. Hence, the operator of a delegated data object is retrieved and then executed by the data structure.

The delegated data object comprises inputs parameters that are specific of the type of the delegated data object. The delegated also comprises one or more operators that are specific to the type of the delegated data object.

Figure 4:
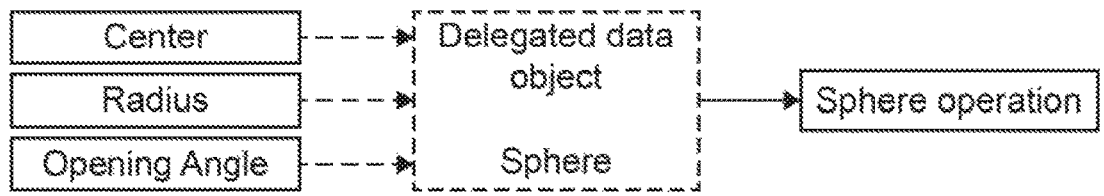

FIG. 4 illustrates an example of the delegated data object specific to the type "sphere". When the delegated object is executed by the generic feature that is when the system asks the feature "sphere" to build itself, the generic feature delegates this to the delegated data object for the specific type. In this example above, the delegated data object knows it should build a sphere using the 'Center', 'Radius' and 'Opening Angle' as parameters. As such, the delegated object will generate an operation using its input parameters. This operation will then be used by the generic feature to generate its topology. So, if for any reason, the delegated object is replaced by another one, it will be transparent from the generic feature point of view as it will still retrieve and run the operation given by the delegated object.

The parameters of the delegated data object allow instantiating the operator that generates an output topology. For instances, as known in the art:
- the input parameters specific to a type "sphere" are the center, the radius and the opening angle;
- the input parameters specific to a type "cylinder" are the direction of the axis, the height of the cylinder, the center and the radius of the circle;
- the input parameters specific to a type "cone" are the axis direction, the height of the cone, the center and the radius of the cone base;
- the input parameters specific to a type "torus" are the direction vector, the center, the radius for the great circle and the radius for the small circle.

The data structure further comprises an output topology generated by the operator. The topology depends on the type of the delegated data object.

In examples, an operation may be performed by the operator specific to the type of the delegated data object. In of such situation the operation is also referred to as internal operation: the topology of the output topology is not modified. An internal operation is typically an operation executed as a result of a modification of an input parameter of the delegated data object, e.g. a scale or a move of on the output topology. A list of these operations may be associated with the delegated data object so that the generic feature has the knowledge that the modification may be executed by the operation already "loaded" on the generic feature.

In examples, an operation may be performed by an operator that is not the specific operator of the delegated data object. In such situation the operation is also referred to as external operation: the output topology is modified. An external operation is typically an operation that cannot be executed by the operator of the delegated data object as the topology of the output is modified, e.g. a cut is performed on the 3D representation of the 3D model defined by the data structure. In order to execute the operation, the data structure may comprise an interface adapted to add or to remove at least one operator. The operator may be "loaded" on the data structure and executed thereof. The operator of the delegated data object may be kept loaded on generic feature or simply removed. The data structure contains at least one operator at all times.

In examples, the output topology may be rendered so that a representation of the 3D model defined by the data structure is accessible, e.g. display to a user. The output topology may be represented with a mesh, as known in the art. The mesh may be a subdivision surface that is a method of representing a smooth surface via the specification of a coarser piecewise linear polygon mesh. The subdivision surface may include a base mesh that comprises the definition of the surface (that is, a set of vertices, edges and faces from which the surface is computed) and control points of the mesh (for instance control points of Bezier curves, Nurbs).

Figure 5:
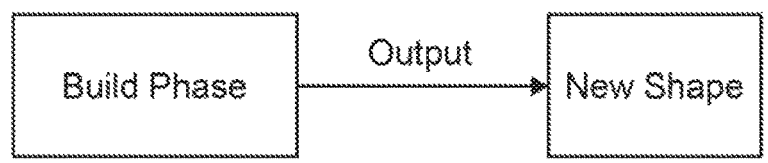
FIGS. 5 to 6 show examples of the build phase with the data structure.
Figure 6:
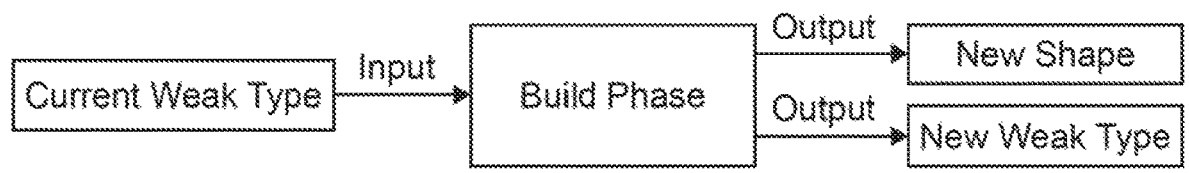

Referring now to FIGS. 5 and 6, a build phase of the 3D model defined by the data structure according to the embodiments is now discussed.

FIG. 5 represents a build phase of a generic feature in a history-free system, as known in the art. When a user asks for the modification of a shape, the system goes through a Build phase of the shape. Usually, during this phase, an operator representing the current modification is called, the result of this operator is the new shape associated to the current shape. The to build phase has one output, which is the new shape.

FIG. 6 represents a build phase of the data structure of the embodiments. The build phase of the present embodiments is different because the Build phase does not just compute the new shape according to the current modification, it also ensures that the delegated data object is still consistent and if not, a new delegated data object is provided to the data structure.

The Build phase is now discussed with more precision in reference to FIG. 8. FIG. 8 is an example of a computer-implemented method for designing a 3D model with the data structure of the present embodiments. Especially, the build phase of FIG. 8 improves the life cycle of the data structure that defined the 3D model, more particularly the delegated data object that notably defines the type of the 3D model (e.g. the type "sphere").

The method for designing a 3D model comprises providing a first 3D model. The first 3D model may be defined by the data structure previously discussed. In all cases, the first 3D model is defined by (i) one delegated data object comprising input parameters specific to a type of the delegated data object and (ii) an output topology. In the event the data structure defining the 3D model is similar to the one previously discussed in reference to FIGS. 2 to 6, it further comprises at least one operator specific to the type of the delegated data object for generating an output topology, and the output topology is generated by the operator.

The first 3D model is referred to as "Current Generic Feature Geometry". The term generic feature has been already defined. Here the expression "Generic Feature Geometry" means that a mesh representing the 3D model has been computed, e.g. the 3D model is displayed to the user.

The 3D model is associated with a sequence of geometric design operations. A design operation is a modification performed upon user action on the 3D model. Typically, the user performs a modification on the mesh of the 3D model. Modifying the mesh of the 3D model is a typical user action on a history-free CAD system.

A sequence means that the design operations are stored in a specific order. In example, the sequence of design operations may be the design operations ranked according to a successive arrival order. Thus, it is possible to obtain the order of arrival in the sequence of a given design operation. This order may be that the latest arrived design operation is stored at the end of the sequence of geometric design operation. Hence, first design operation is ranked first, a second is ranked second, a third design operation is ranked third, and an $n^{th}$ design operation is ranked $n^{th}$.

The sequence may comprise only one design operation. Such situation may occur at the time a 3D model is created from the its data structure for the first time: indeed, this new instantiation of the generic feature is performed based on parameters values, which is considered as design operation by the system.

Then, the user (e.g. a designer) performs a first geometric design operation on the first 3D model, thereby obtaining a second 3D model. The first design operation may be a modification of at least one input parameter value of the first 3D model. The design operation may be a modification of the mesh (or deformation of the mesh), e.g. the user moves a vertex, edge, face of the mesh.

The mesh is a collection of vertices, edges and faces that defines the shape of a 3D model. The mesh thus defines a geometry from which a graphical representation of the output topology of the 3D model can be generated. The mesh may be a subdivision surface that is generally used to model free-form surfaces of arbitrary topology. A subdivision surface is defined as the limit of a refinement process starting with a polygonal base mesh of control points. The control points of the base mesh transmit progressive changes to the subdivision surface. The mesh of the subdivision surface is thus refined as a result of an iteration of a subdivision process that is controlled by the control points of the base mesh. Hence, the subdivision surfaces approximate or interpolate the base mesh. The Catmull-Clark algorithm is an example of such a subdivision scheme. Base meshes are widely used in CAD and a simple definition can be that a base mesh comprises the definition of a subdivision mesh and control points of subdivision mesh. It is to be understood that several dedicated algorithms may be used.

Figure 12A:
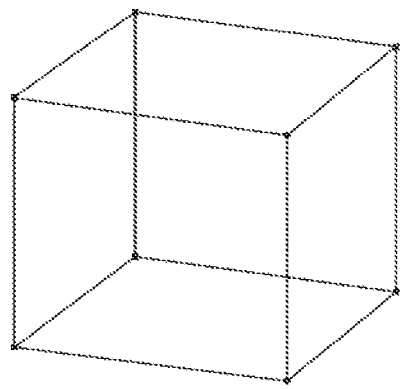
FIGS. 12a, 12b, 12c and 12d show examples of base meshes defined by the data structure.
Figure 12B:
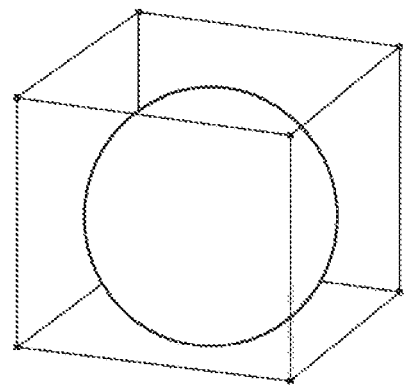
Figure 12C:
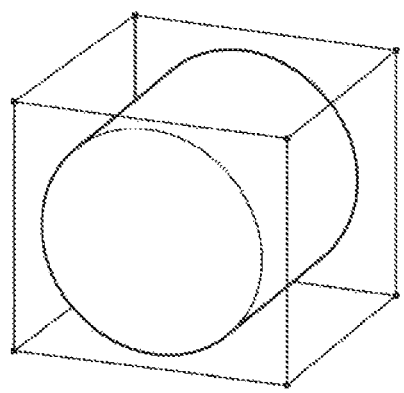
Figure 12D:
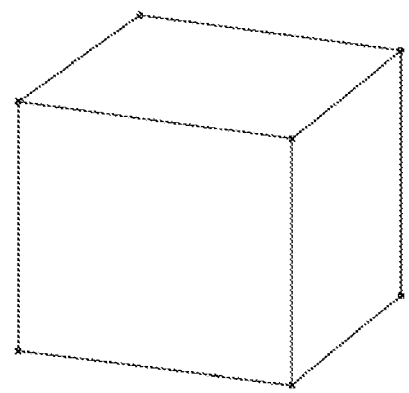

Thus, a design operation may be a modification of the mesh upon user action on one of the control points of the base mesh. Examples of design operations on the base mesh are represented on FIGS. 12a, 12b, 12c and 12d. FIG. 12a illustrates an example of base mesh that is a Cubic Base Mesh. The cubic Base mesh has 8 control points and the edges have the same length. No weight is attached to any of the vertices, edges or face. In FIG. 12b, the user has displaced (or moved) a control point of the base mesh of FIG. 12a that controls the subdivision of the original cube into a sphere, e.g., with a Catmull-Clark algorithm. FIG. 12c illustrates the subdivision surface obtained from the base mesh of FIG. 12a that is Cubic Base Mesh (8 control points) with the edges have the same length, a Weight (100% sharp) on two opposite faces. A cylinder is therefore obtained. FIG. 12d illustrates the subdivision surface obtained from the base mesh of FIG. 12a that is Cubic Base Mesh (8 control points) with the edges have the same length and a weight (100% sharp) on each edge. A cube is obtained. In these examples, the control points modify the weight of vertices or edges or faces and thus the subdivision process. Attractiveness one the mesh is made by the weights.

Thus, when a modification of the mesh is detected, the system is aware that a design operation has been performed. As a result of the design operation, a second 3D model is obtained. The second 3D model is stored in volatile memory, being understood that it might be stored or is also stored in a non-volatile memory.

After a design operation has been detected, a computation is performed for determining whether the output topology of the second 3D model can be retrieved from the output topology of the first 3D model. This operation thus aims at verifying whether or not the respective output topologies of the first and second 3D model are the same. For the sake of explanation only, it is reminded that the topology of a 3D model defines how the spatial properties of the 3D model are preserved under continuous deformations; especially how elements are bounded and connected. The topology concerns about the non-geometric relations between entities (e.g. topological entities such as solid, face, edge, vertex).

In examples, the determination of a change of topology after a design operation on the first 3D model may be computed from an analysis of the topological stability between the first and second topological outputs of the first and second model. An operation is topologically stable when the topology is unchanged as a result of the design operation. An operation is topologically stable when a bijective relation between the topological elements of the output topology of the first 3D model and the topological elements of the output topology of the second 3D model is preserved.

In examples, the topological stability between the two output topologies may be verified (or not) by comparing the base mesh of the first 3D model with the base mesh of the second 3D model. For instance, a change of the number of control points involves a change of topology.

Depending of the result of the topological stability (and more generally of the determination whether the output topology of the second 3D model can be retrieved from the output topology of the first 3D model), the first delegated data object is replaced or kept.

The first delegated data object is replaced if the output topology of the second 3D model cannot be retrieved from the output topology of the first 3D model; in other words when the modification made by the user is not topologically stable.

In examples, the replacement of the first delegated data objects by a second one is performed by identifying an output topology that is similar to the new output topology obtained as a result of the first design operation. This may be performed by comparing the second output topology (the new one obtained as a result of the modification) with output topologies of a list of output topologies. Each output topology of the list is associated with one delegated data object, so that when a correspondence between the new output topologies and an output topology of the list identified, the associated delegated data object is retained a the new one. Said otherwise, a third delegated data object is selected as a result of the comparison, and the third delegated data object is a delegated data object of the list with an associated output topology that is the same as the second output topology. The selection of the third delegated data object may be automatically performed, e.g. the user does not intervene.

On the contrary, the first delegated data object is kept if the output topology of the second 3D model can be retrieved from the output topology of the first 3D model. Thus, the type of the generic feature is not changed. In addition, the first geometric design operation is stored with the sequence of geometric design operations associated the first 3D model. This means that the design operation is stored together with past design operations that did not change the output topology of the 3D model.

In examples, storing the design operation with the sequence of geometric design operations is performed according to a successive arrival order of the geometric design operations previously stored. A successive arrival order means that the geometric design operations are implicitly ranked, as already discussed.

In examples, the storage of a geometric design operation may comprise storing information regarding the geometry of the mesh. For instance, the complete set of data for recomputing the mesh may be stored. In another example, the new position(s) of the one or more vertices as a result of the geometric design operation are stored.

In another example, the one or more vertices of the mesh having their positions modified by the design operation are identified. Each vertex of the mesh may be uniquely identified. Then, a transformation is computed for each identified vertex; at least for each vertex with a modified position as a result of the geometric design operation. A transformation comprises the data allowing computing of the new position of a vertex from its former position. Interestingly, this reduces the amount of data to be stored. Especially, the position in the 3D space is stored only one time (when the mesh of the 3D model is instantiated for the first time at the providing step). Then, only couples (vertex identifier; transformation) are stored for each geometric design operation.

In examples, when a delegated data object is replaced by another delegated data object the sequence of geometric operations associated with the replaced one is emptied. The sequence of geometrical operations is erased. Indeed, the delegated data object that replaces the delegated data object on which the last geometric design operation has been performed, comprises all the geometric design operations performed on the replaced delegated data object. Storing the sequence of geometrical operations is thus not needed.

The present embodiments notably relies on the fact that the parameters of some geometric design operations are stored in order to run them later. Running means that the sequence of operation will be applied. However, not all the design operations have to be stored: only topologically stable operations are stored because instable topological operations are too destructive of the delegated data object and can introduce stability issues when running the stored operations. By definition, such stable operations can be divided into a sequence of deformation. There exists a list of transformations that, if applied to a set of points is equivalent to the current modification. This is what the method stores.

A list of operation done on the data structure defining the 3D model are stored in order to keep the current delegated data object as long as possible. Moreover, these stored operations are to be run on top of the geometry of the current delegated data object. Indeed, when modifying one of the parameters of the delegated data object, the geometry of the current delegated data object is first modified, and then the stored sequence of geometric design operations is applied.

It means two things. First, the geometry of the current delegated data object may be different than the data structure geometry; the geometry of the delegated data object has to be stored. Second, for each modification, if the geometric design operation changes one of the parameters of the delegated data object, the sequence of geometric design operations is run and then the result is stored as the new geometry of the delegated data object.

If a geometric design operation cannot be stored, the delegated data object changes and a generic delegated data object is set. In this case, the shape built through the previous steps of the build phase becomes the geometry of this generic delegated data object. Thus, the list of stored operations is emptied as they are now contained in the geometry of the generic delegated data object.

Figure 9:
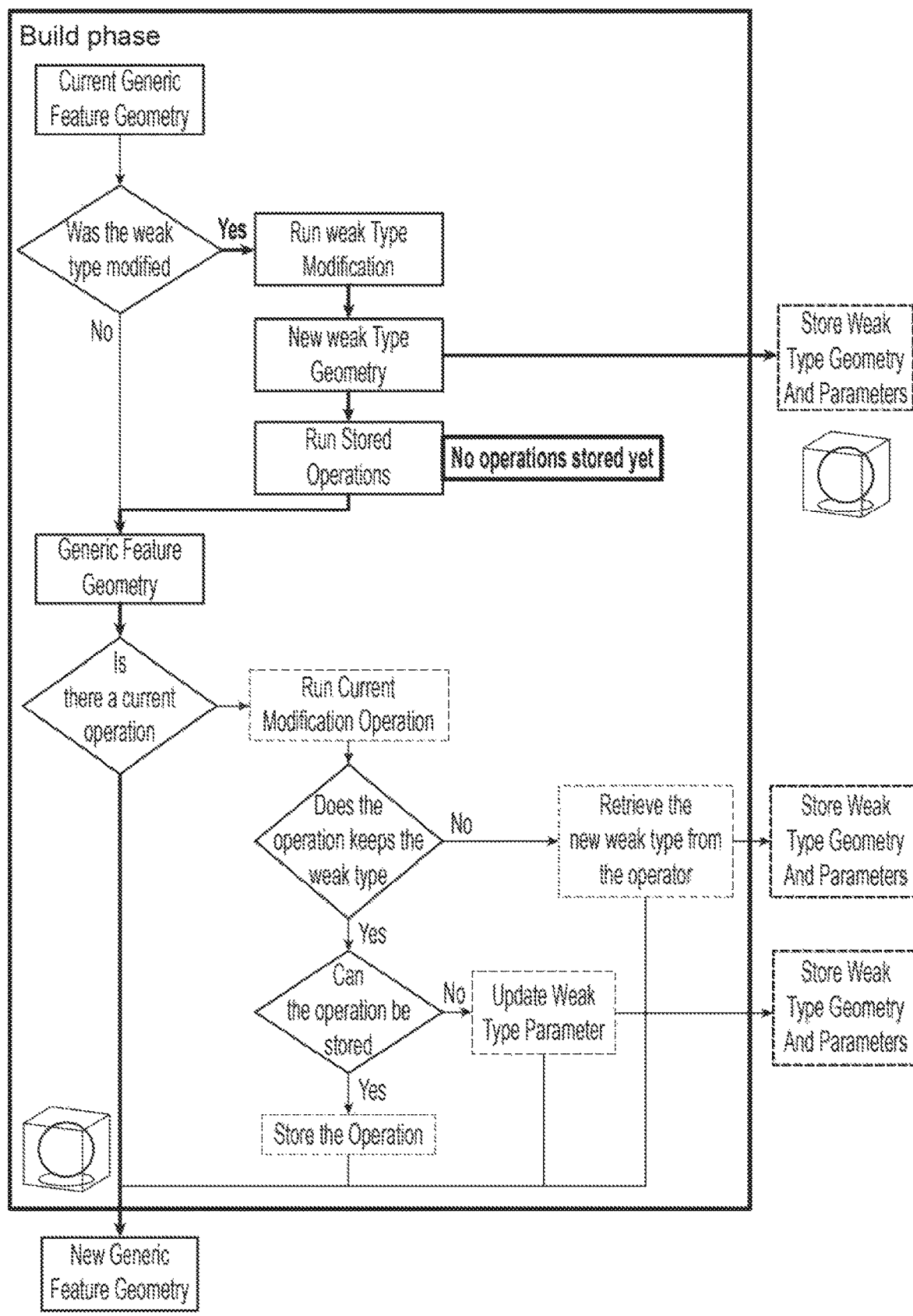
FIGS. 9, 10 and 11 illustrate use cases of the method for designing a 3D model.
Figure 10:
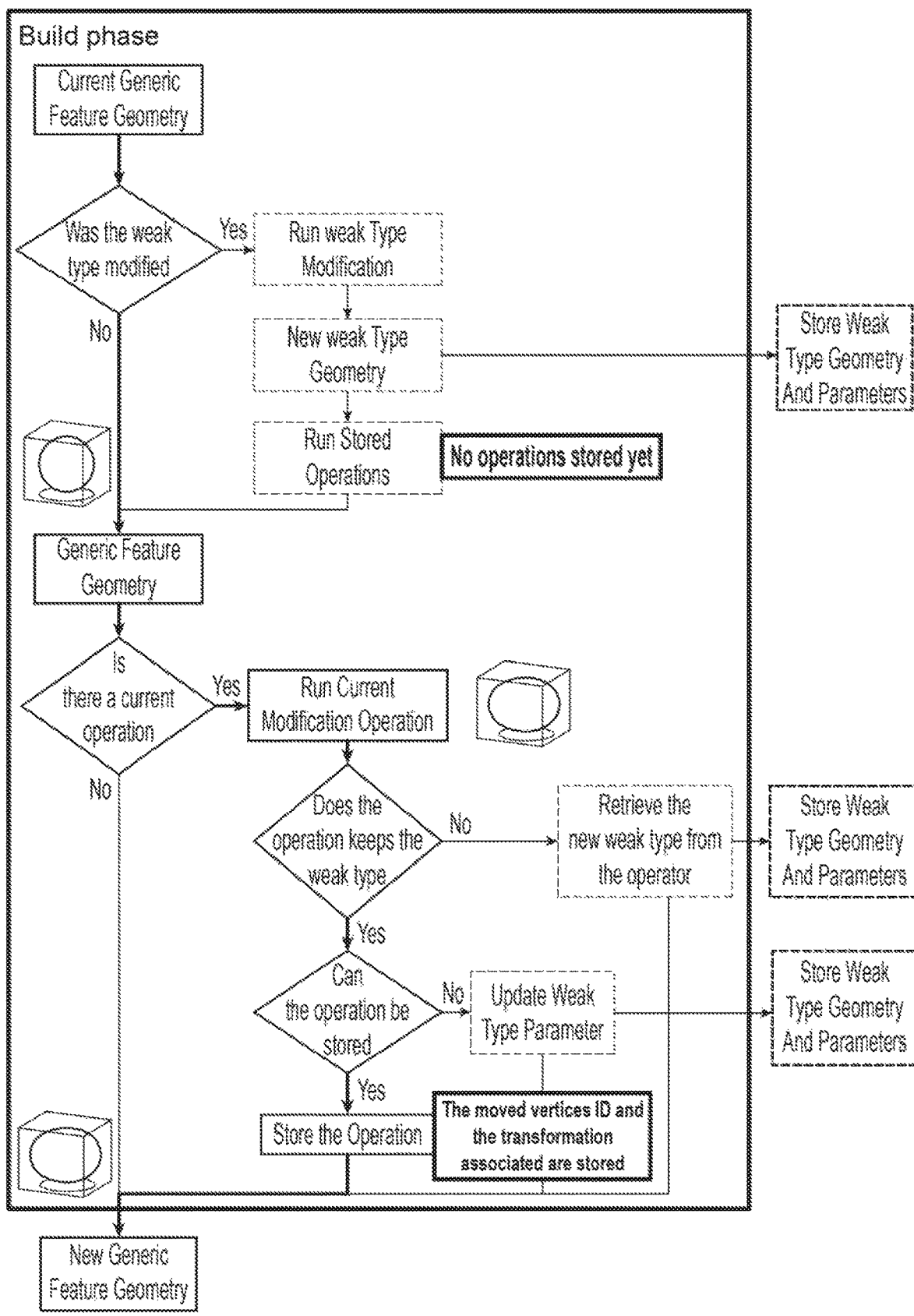
Figure 11:
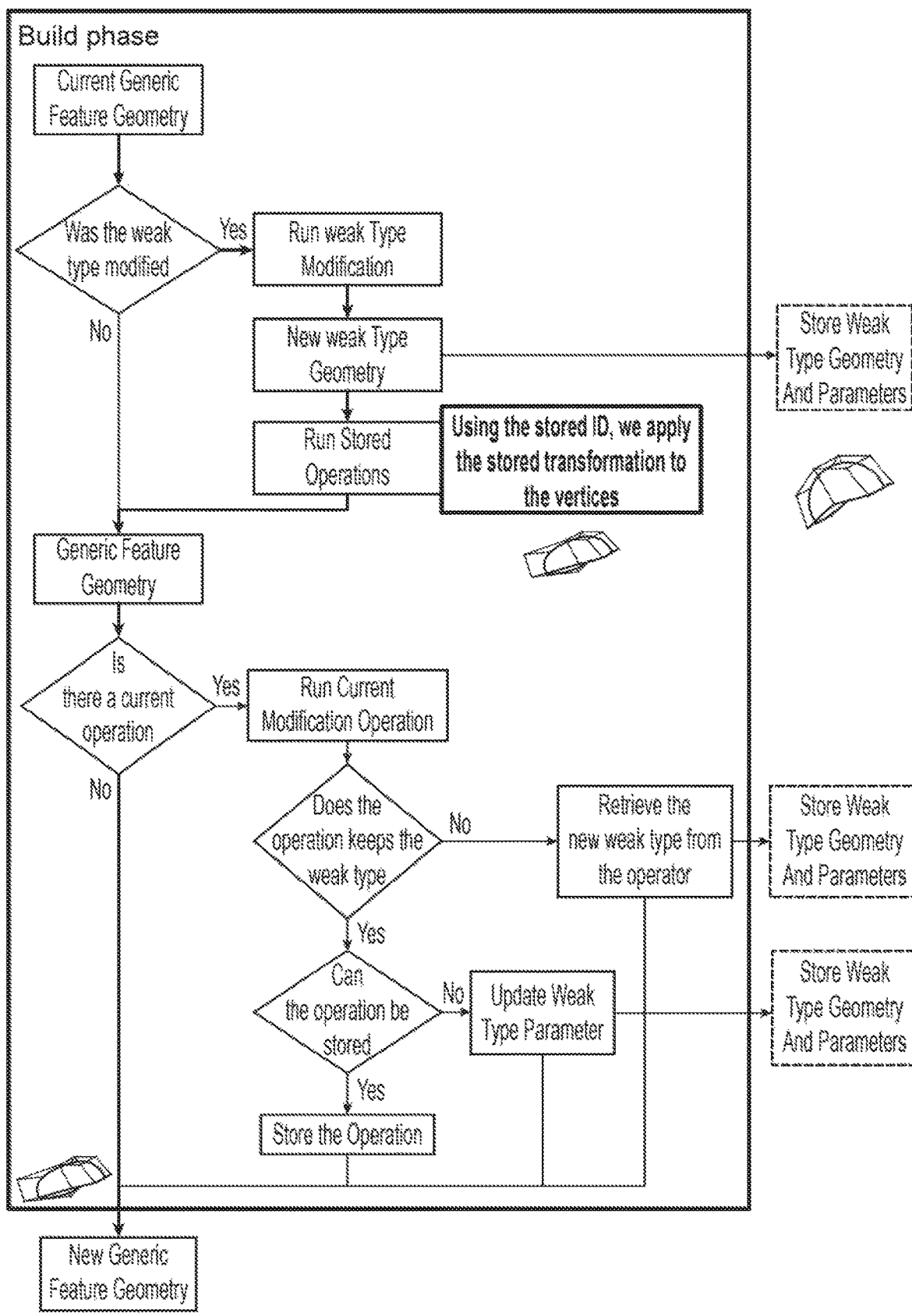

In reference to FIGS. 9 to 11, examples of the present method are now discussed.

FIG. 9 illustrates the case where the user creates explicitly a sphere. As such, the system can directly create a data structure with the delegated data is object for the type "sphere", The creation of the sphere is considered by the system as design operation (the "weak type is modified").

Figure 7A:
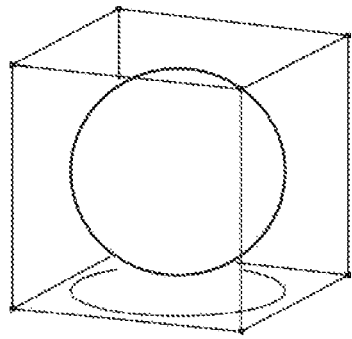
FIGS. 7a, 7b, 7c and 7d illustrate modifications performed on a 3D model defined by the data structure.

The so-called "Run weak type modification" is executed, that is, the data structure with the delegated data object for the type "sphere" is instantiated with input parameters values. The input parameters values may be default parameters values or provided by the user. Then, the geometry of data structure with the delegated data object for the type "sphere" is computed and may be displayed to the user. In reference to FIG. 7a, the base-mesh of a sphere is displayed to the user.

Next, no "stored operations" are run as the creation of the sphere has just begun. Consequently, the sequence of geometric design operations is empty.

After performing the "Run stored operation" (no operation being done at this step of the scenario), the geometry of data structure with the delegated data object for the type "sphere" is available to the user.

Because no geometric design operations are performed (the response is no at "Is there a current operation"), the "new generic feature geometry" is the instantiated sphere.

FIG. 10 illustrates the case a deformation is performed by the user on the base-mesh of the sphere of the output of FIG. 9. Each operation that in fact results in the displacement of a point of mesh (e.g. a control point of the base-mesh is displaced) is considered as being candidate for storage. Such operation is stored as a set of points associated to a transformation. In this case where the user deforms the sphere using one of its edge, it is equivalent to deforming the same sphere using the two vertices of the edge of the base-mesh, as illustrated on FIG. 1b. Each vertex can be identified by a specific ID, which is what will be stored along with the mathematical transformation.

The "Current Generic feature geometry" is the base-mesh of the sphere. As the delegated data object for the type "sphere" was not modified, the next step is the test "Is there a current operation". The answer to the test is yes as the user performs geometric design operation, a deformation of the sphere. The "Current modification operation is run", which means that the user's deformation of the sphere is applied.

The next test is "Does the operation keeps the weak type". In other words, it is determined whether the output topology of the deformed sphere can be retrieved from the initial sphere (without the deformation). In the example of FIG. 10, the delegated data object for the type "sphere" is kept as the topological stability of the sphere was kept despite the deformation.

In the event the answer to this test would be no, that is the topological stability would not have been preserved, then the current delegated data object of the type "sphere" would have been replaced by a more appropriate delegated data object.

The next test is "Can the operation be stored". It is determined whether the former geometric design operation (the deformation of the sphere) is a mere update of an input parameter of the delegated data object of the type sphere or not. In the present scenario, this is not the case. And as a result, the geometric design operation is stored in the sequence of geometric design operation.

The output of FIG. 10 is the deformed geometry of the delegated data object of the type sphere. The delegated data object is still the sphere; the generic feature is of the type "sphere" and has not been changed.

FIG. 11 illustrates the case an input parameter of the output of FIG. 10 is modified. The input of the scenario of FIG. 11 is the output of FIG. 10.

The first test is "Was the weak type modified". The answer to the test is positive as at least one input parameter of the current delegated data object has been modified by the user. The "Run weak type modification" is executed and the sphere is modified in accordance with the new input parameter(s). Then, the geometry of modified data structure is computed. The geometry is not shown to the user. In reference to FIG. 7c, a representation of the base-mesh of a sphere is represented after a modification of the input parameter "opening angle" of the delegated data object.

The modification is not stored with the sequence of geometric design is operation as the user has modified an input parameter (the opening angle of the sphere) of the delegated data object. The modified parameter value is stored in the delegated object, but not the associated operation.

Figure 7B:
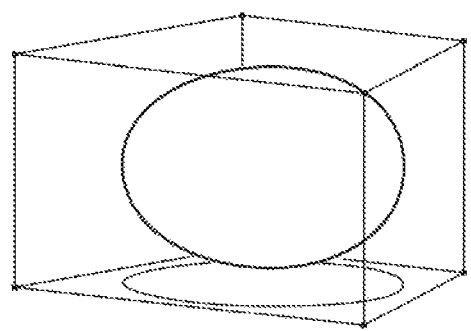
Figure 7C:
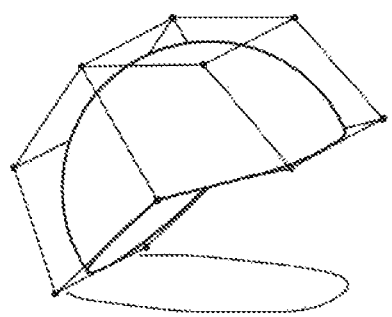

Next, the sequence of geometric design operation is applied (or run) on top of the new weak type, that is on top of the sphere illustrated on FIG. 7b. The result is a new geometry of the sphere, as illustrated FIG. 7d.

Figure 7D:
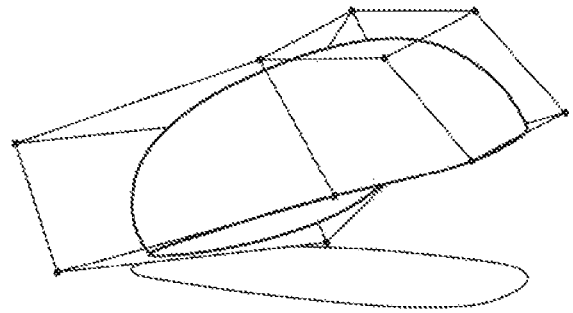

Because no geometric design operations is performed (the response is no at "Is there a current operation"), the "new generic feature geometry" is the modified sphere as represented on FIG. 7d.

So now, when deforming the sphere, as the deformation does not modify the shape's topology, the system can keep the delegated data object of the type "sphere". The user is then able to modify afterwards the parameters of the sphere. Then, modifying the original sphere's opening angle for instance will result in the deformation being replayed. The system will first modify the delegated type internally, that is to say that the user will not see this result, and then the system will apply the stored transformations and will display the result.

Hence, the parameters used to create the initial shape can still be modified after other operations are done on the shape, and the user can change the type of the initial shape any time after its creation. Therefore, the flexibility of the history-free approach is thus improved as the system can keep the current delegated data object much longer, expanding its life cycle.

Because the system is able to keep the weak type longer, the user has more control over his shape. The interactions of the user with the system are improved: the user does not have to worry about the order in which he does his modification, the system is handling it for him.

The invention claimed is:

1. A computer-implemented method for designing a three-dimensional (3D) model, comprising:
   obtaining a first 3D model, the first 3D model
      being defined by:
         one delegated data object comprising input parameters specific to a type of the delegated data object, and
         an output topology, and
      being associated with a sequence of geometric design operations;
   performing, by a user, a first geometric design operation on the first 3D model, thereby obtaining a second 3D model;
   determining whether the output topology of the second 3D model can be retrieved from the output topology of the first 3D model; and
   replacing the first delegated data object by a second delegated data object if the output topology of the second 3D model cannot be retrieved from the output topology of the first 3D model or keeping the first delegated data object and storing the first geometric design operation with the sequence of geometric design operations associated the first 3D model,
   wherein determining whether the output topology of the second 3D model can be retrieved from the output topology of the first 3D model is performed by determining topological stability between the output topology of the first 3D model and the output topology of the second 3D model.

2. The computer-implemented method claim 1, wherein each of the output topology of the first and second 3D models forms a base mesh and wherein the determining topological stability is performed by comparing the base mesh of the first 3D model with the base mesh of the second 3D model.

3. The computer-implemented method of claim 1, wherein replacing the first delegated data object by a second delegated data object includes:
   comparing the second output topology with a list of output topologies, each output topology of the list being associated with one respective delegated data object, and
   automatically selecting a third delegated data object as a result of the comparison, the third delegated data object being a delegated data object of the list with an associated output topology that is similar to the second output topology.

4. The computer-implemented method of claim 1, wherein replacing the first delegated data object by the second delegated data object further includes:
   emptying the sequence of geometric operations.

5. The computer-implemented method of claim 1, wherein storing the first geometric design operation includes:
   identifying at least one vertex of a geometry associated with the first delegated data object having its position modified by the design operation, and
   computing a transformation of the identified at least one vertex, the transformation resulting of the first design operation.

6. The computer-implemented method of claim 1, wherein:
   obtaining the first 3D model includes creating the first 3D model, the creation being a first geometric design operation, and
   the sequence of geometric design operations of the created first 3D model is empty.

7. The computer-implemented method of claim 1, wherein the first geometric design operation is a modification of at least one input parameter value of the first 3D model.

8. The computer-implemented method of claim 1, wherein the storing the design operation with the sequence of geometric design operations is performed according to a successive arrival order, the latest arrived design operation being stored at the end of the sequence of geometric design operation.

9. A non-transitory computer readable storage medium having recorded thereon a computer program including instructions for performing a method for designing a three-dimensional (3D) model, the method comprising:
   obtaining a first 3D model, the first 3D model
      being defined by:

one delegated data object comprising input parameters specific to a type of the delegated data object; and an output topology, and being associated with a sequence of geometric design operations;

performing, by a user, a first geometric design operation on the first 3D model, thereby obtaining a second 3D model;

determining whether the output topology of the second 3D model can be retrieved from the output topology of the first 3D model; and replacing the first delegated data object by a second delegated data object if the output topology of the second 3D model cannot be retrieved from the output topology of the first 3D model or keeping the first delegated data object and storing the first geometric design operation with the sequence of geometric design operations associated the first 3D model, wherein determining whether the output topology of the second 3D model can be retrieved from the output topology of the first 3D model is performed by determining topological stability between the output topology of the first 3D model and the output topology of the second 3D model.

10. The non-transitory computer-implemented method claim 9, wherein each of the output topology of the first and second 3D models forms a base mesh and wherein the determining topological stability is performed by comparing the base mesh of the first 3D model with the base mesh of the second 3D model.

11. The non-transitory computer-implemented method of claim 9, wherein replacing the first delegated data object by a second delegated data object includes:

comparing the second output topology with a list of output topologies, each output topology of the list being associated with one respective delegated data object, and automatically selecting a third delegated data object as a result of the comparison, the third delegated data object being a delegated data object of the list with an associated output topology that is similar to the second output topology.

12. The non-transitory computer-implemented method of claim 9, wherein replacing the first delegated data object by the second delegated data object further includes:

emptying the sequence of geometric operations.

13. The non-transitory computer-implemented method of claim 9, wherein storing the first geometric design operation includes:

identifying at least one vertex of a geometry associated with the first delegated data object having its position modified by the design operation, and computing a transformation of the identified at least one vertex, the transformation resulting of the first design operation.

14. The non-transitory computer-implemented method of claim 13, wherein:

obtaining the first 3D model includes creating the first 3D model, the creation being a first geometric design operation, and the sequence of geometric design operations of the created first 3D model is empty.

15. The non-transitory computer-implemented method of claim 9, wherein the first geometric design operation is a modification of at least one input parameter value of the first 3D model.

16. The non-transitory computer-implemented method of claim 9, wherein the storing the design operation with the sequence of geometric design operations is performed according to a successive arrival order, the latest arrived design operation being stored at the end of the sequence of geometric design operation.

17. A system comprising;

a processor coupled to a memory, the memory having recorded thereon a computer program including instructions for designing a three-dimensional (3D) model that when executed by the processor causes the processor to:

obtain a first 3D model, the first 3D model
being defined by:
one delegated data object comprising input parameters specific to a type of the delegated data object; and an output topology, and being associated with a sequence of geometric design operations, perform, by a user, a first geometric design operation on the first 3D model, thereby obtaining a second 3D model, determine whether the output topology of the second 3D model can be retrieved from the output topology of the first 3D model, and replace the first delegated data object by a second delegated data object if the output topology of the second 3D model cannot be retrieved from the output topology of the first 3D model or keep the first delegated data object and store the first geometric design operation with the sequence of geometric design operations associated the first 3D model, wherein the processor is configured to determine whether the output topology of the second 3D model is retrievable from the output topology of the first 3D model by being configured to determine topological stability between the output topology of the first 3D model and the output topology of the second 3D model.

* * * * *